United States Patent Office 3,619,991
Patented Nov. 16, 1971

3,619,991
COTTON HARVESTING METHODS AND COMPOSITIONS
William A. Erby, Downers Grove, Ill., and Robert A. Walde, Emmaus, Pa., assignors to Air Products and Chemicals Inc., Philadelphia, Pa.
No Drawing. Continuation-in-part of application Ser. No. 714,761, Mar. 21, 1968. This application Sept. 9, 1968, Ser. No. 758,577
Int. Cl. A01d *45/20, 45/18*
U.S. Cl. 56—1          9 Claims

ABSTRACT OF THE DISCLOSURE

Methods of harvesting cotton are disclosed which rely upon the unique effects of salts of 2,3,5,5,5-pentachloro-4-keton pentenoic acid, particularly those salts made with ammonia and $C_1$–$C_{18}$ organic amines. Depending upon the rate of application to living cotton plants, these effects vary. They include quick wilting followed by defoliation, thus permitting a first picking after initial wilting and, if desired, a second picking after defoliation. With other dosage rates, the quick wilting may be followed by desiccation rather than by defoliation, thus permitting a first picking in wilted condition followed by strip harvesting of the remaining cotton. The salts may also be used either as desiccants, per se, or as defoliants which both defoliate the plant and promote boll opening. Agricultural formulations are also disclosed.

CROSS-REFERENCES TO RELATED APPLICATIONS

This application is a continuation-in-part of our co-pending application Ser. No. 714,761 filed Mar. 21, 1968 which is entitled "Method of Preparing Halogenated Olefinic Derivatives of Saturated Gamma-Keto Mono-Carboxy Acids and Related Compounds." That application, in turn, derives from our co-pending application Ser. No. 541,096, and now Pat. No. 3,577,546, filed Apr. 18, 1966 which is entitled "Preparation and Use of Polychloro Keto Alkenoic Acids."

BACKGROUND OF THE INVENTION

(1) Field of the invention

This invention relates to the regulation of plant function with salts of an organic compound. More particularly, it relates to improved methods of harvesting cotton which utilize the plant growth regulating characteristics of particular salts of 2,3,5,5,5 - pentachloro - 4 - keto pentenoic acid.

(2) Description of the prior art

The picking of cotton was originally a hand operation extending over several weeks of time as cotton bolls successively ripened and burst open. Today, particularly in countries such as the United States where labor is scarce and expensive, mechanical harvesting techniques are used extensively.

There are two general types of cotton harvesting equipment. The first of these is termed a stripper or sled which picks all of the cotton in a field, regardless of the degree of boll development. The second type of machine is the spindle picker which is more selective than a stripper and is designed to pick cotton lint from open bolls and wind up only the seed cotton which comes away from the boll easily. Nevertheless, this type of picker, though more selective than the stripper, produces more trash than is found in hand-picked cotton. There are also currently under development pickers termed brush pickers which, for purposes of this discussion, may be classified with spindle pickers.

When stripper pickers are used, particularly in parts of Texas and Oklahoma it is customary to treat the crop with chemical desiccants. Use of such material kills and dehydrates the plant so that the trash gathered with the cotton (e.g. leaves, twigs, burrs, unopened and immature bolls, etc.) is relatively dry. Such cotton can be stored safely prior to ginning and chlorophyl staining is also prevented. A popular desiccant, arsenic acid, although effective is extremely toxic. Accordingly, a need exists for a dessicant of minimal toxicity for use in connection with strip harvesting.

When cotton is to be picked using a spindle picker, it is customary to treat the crop with a defoliant rather than a desiccant. Such materials cause leaf abscission eventuating in defoliation which, in turn, assists in the rapid opening of mature bolls, gives good spindle contact with the lint in open bolls and keeps the trash in the picked cotton at an acceptably low level by the elimination of the leaves. Further, defoliants also reduce excessive moisture in harvested seed cotton. A common defoliant for this purpose is S,S,S,-tributyl phosphorotrithioate. Preparation of this material is described in U.S. Pat. No. 2,943,107 and its use for defoliation is described in U.S. Pat. No. 2,965,467.

Current defoliants, such as the one described above, are applied from seven to fourteen days prior to the projected date for picking. During this waiting period, the growth process is retarded. The grower, while awaiting the defoliation action, is at the mercy of the elements and can lose all or part of his crop due to bad weather.

In an attempt to overcome these difficulties, bottom defoliation is sometimes used. Defoliant is selectively applied to the lower part of the plant, where the mature bolls are first found; the defoliant is allowed to take effect; the bottom crop is picked selectively (e.g. by utilizing a packer from which several top rows of spindles have been temporarily removed) and, some weeks thereafter, defoliant may be applied to the entire plant for complete defoliation. This technique, while permitting multiple picking to increase the yield of quality cotton, increases the length and number of weather-vulnerable periods. Further, two applications of defoliant chemical may be necessary and the labor cost of the first application not only represents an additional expense but is also more difficult than a single application where a broad spray pattern can be used non-selectively over the entirety of the plant.

SUMMARY OF THE INVENTION

Briefly summarized, the invention comprises the application to cotton plants, in situ, of effective amounts of a salt of 2,3,5,5,5-pentachloro-4-keto-pentenoic acid, preferably the ammonia and/or $C_1$–$C_{18}$ amine salts thereof as a part of a harvesting program. The application of these compounds may be made in standard agricultural formulations or in admixture with other active ingredients, some of which may be synergistic. The resultant effect on cotton plants is a combined function of the rate of application, ambient weather conditions, and the degree of maturity of the plant. Harvesting methods of the invention, all utilizing properties of the above compounds include:

(a) The artificial induction of defoliation and boll opening: This is particularly useful in latitudes with a short growth season or in long season latitudes, where the season has been effectively shortened by adverse weather conditions. Such methods generally require the application of from 1 to 6 pounds per acre and the desired effect often requires a week to become evident.

(b) The wilt harvesting of cotton: Applications on the order of from 1 to 6 pounds per acre cause wilting of the plant to occur within from 4 to 24 hours and cotton can be picked from these plants as soon as wilting occurs. Wilting is followed by defoliation or desiccation, with high application rates favoring desiccation. At that time, if desired, a second harvest can be obtained.

(c) Use as a non-toxic desiccant: Where it is desired to kill the plant and strip the fields completely using techniques such as, for example, strip picking the salts can be used as desiccants with relatively high application rates.

These methods are not to be interpreted as being necessarily mutually exclusive. They do however bring an added degree of freedom to the grower and constitute an addition to the "bag of tricks" available to him. They help bring into an essentially risky business additional degrees of control.

Accordingly, it is an object of the invention to provide methods of harvesting cotton wherein a salt of 2,3,5,5,5-pentachloro-4-keto pentenoic acid is used as a chemical harvesting aid.

It is also an object of the invention to provide a method of wilt-harvesting using one of said compounds.

A further object of the invention is to provide a method of harvesting wherein one of said compounds is utilized to cause defoliation and boll opening.

Still another object of the invention is the provision of a cotton desiccant which has minimal toxicity and a relatively rapid effectiveness.

An additional object of the invention is the provision of agricultural compositions wherein the physiologically active polychloro keto pentenoic acid moiety is present in a form such that corrosion of incidental storage and spray equipment is minimized when compared to the free acid forms thereof.

These and other objects of the invention will be apparent to those skilled in the art from a consideration of the exemplary description which follows. It should be appreciated that neither the abstract of the disclosure nor the summary of the invention above is intended to constitute a limitation on its extent. They are inserted merely as aids in information retrieval. Therefore the true scope of the invention is to be determined only by a reasonable interpretation of the appended claims in the light of the following description.

DESCRIPTION OF THE PREFERRED EMBODIMENTS

The active ingredients used in the instant invention are salts of a material comprising predominantly cis-2,3,5,5,5-pentachloro-4-keto pentenoic acid. The acid form of the compound may be represented by the following structural formula:

$$Cl_3-C-C-C=C-C-OH$$
$$\phantom{Cl_3-}\overset{\|}{O}\phantom{-}\overset{|}{Cl}\phantom{-}\overset{|}{Cl}\phantom{-C}\overset{\|}{O}$$

Briefly, the acid may be prepared by the direct chlorination of levulinic acid over an extended period of time while raising the temperature gradually from about 50° C. to a temperature in the region of about 250° C. The reaction may be conducted with or without a catalyst. When catalysts are used, those preferred include at least one cation selected from the group consisting of aluminum, zinc, titanium, cobalt, magnesium and calcium (e.g. aluminum chloride, zinc chloride, titanium tetrachloride, cobaltic chloride, magnesium chloride and calcium chloride).

A representative preparation of the free acid is the following:

EXAMPLE 1

11.6 pounds of levulinic acid were placed in a vessel with a sintered glass sparger which permitted rapid and uniform dispersion of elemental chlorine throughout the contents. Chlorine gas was passed into this system while the reaction temperature was held at 60° to 90° C. until about one-third of the total theoretical chlorine had been introduced and reacted. After the initial one-third reacted, the reaction temperature was allowed to increase slowly, due to the exothermic heat of chlorination, to the vicinity of 170° C. and, by supplementary heating, increased thereafter to 190° to 200° C. while maintaining a substantial excess of chlorine. The reaction mixture was held in a temperature range of 190 to 200° C. until there was a substantial drop in the rate of chlorine absorption and HCl release. At this point, a sample was withdrawn from the reactor and washed with n-heptane to yield a white crystalline product. This product was found, by ultimate analysis, to be principally $C_5Cl_5HO_3$. Infra-red analysis showed the following characteristic peaks:

| | |
|---|---|
| $-\overset{\overset{\displaystyle O}{\|}}{C}-$ | 1785 cm.$^{-1}$ |
| $-C=C-$(conj.) | 1625 cm.$^{-1}$ |
| $-\overset{\overset{\displaystyle O}{\|}}{C}-OH$ | 1815 cm.$^{-1}$ |
| $-OH$ | 3375 cm.$^{-1}$ |
| $-Cl$ | 740 cm.$^{-1}$ | from which the structural formula was indicated to be:

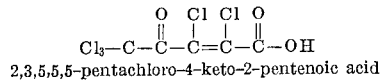

2,3,5,5,5-pentachloro-4-keto-2-pentenoic acid

Typical acids suitable for conversion into the salts used in the instant invention comprise 90.4 weight percent of 2,3,5,5,5-pentachloro-4-keto pentenoic acid, 2.0% dichloromaleic anhydride and 7.6% tetrachloro-4-keto pentenoic acid. As used herein, the terms "acid" or "free acid" mean compositions of this type.

Formation of salts from the free acid materials is conventional. Nonetheless, the following examples may be of benefit to those who are not skilled in the art.

EXAMPLE 2

The product of Example 1 was dissolved in ether (other suitable solvents include, for example, methylenechloride and toluene) and ammonia was slowly bubbled through the solution. An excess of acid was maintained in the media in order to increase yield. The ammonium salt of 2,3,5,5,5-pentachloro-4-keto-2-pentenoic acid precipitated from solution and was recovered by filtration.

Other salts of the free acid were obtained by reactions with various organic amines, preferably those containing from one to eighteen carbon atoms per molecule. As used herein the term "organic amines" is intended to encompass such compounds as well as amines which have been reacted with an alkylene oxide. Amines which have been utilized in this connection include, for example, n-octyl amine, N-oleyl-1,3-propylene diamine, ethylamine, diethylamine, triethylamine, propylamine, dipropylamine, isopropylamine, ethanolamine, diisopropylamine, butylamine, dibutylamine, hexylamine, 2-ethylhexylamine and N-methylbutylamine.

The ammonium salt and salts formed from amines having up to four carbon atoms per molecule are water soluble. Salts made with higher amines are soluble in various common organic (e.g. petroleum derived) solvents. Dependent upon their solubility, the active ingredients can be variously formulated.

Solid compositions may be prepared in the form of dusts for direct application to plants. These may be prepared by mixing the active ingredient with one or more finely divided solid carriers such as, for example, talc, clay, pyrophyllite, silica and fuller's earth.

Formulations may also be prepared as wettable powders with dispersability and wetting properties enhanced by the use of dispersants such as sodium-N-methyl-N-oleyl taurate and the alkali metal salts of lignosulfonic acid.

The active ingredient may also be prepared as a liquid concentrate for dispersion in larger bodies of liquids and such concentrates may include solvents such as xylene, alkylated napthalene, and/or other hydrocarbons. Emulsifying agents such as, for example, the isopropylamine salts of $C_8$-$C_{14}$ alkyl benzene sulfonates may also be included. Solubility of the active ingredients in such formulations may be further increased by the addition of polyols such as ethylene and/or propylene glycol as well as oxyethylated and/or oxypropylated derivatives thereof. Surfactants found particularly beneficial for making spontaneously emulsifiable formulations are mixtures of long chain emulsifyiing organic acids and highly oxyethylated long chain alcohols. All of these formulations, as well as equivalent formulations, serve to provide a convenient means for conveying the desired quantity of active ingredient to the plant.

In order to demonstrate the activity of salts of the invention, two different concentrates of the material of Example 2 were prepared. The first of these was merely an aqueous solution, diluted to give a spray volume of 20 gallons per acre. This material will be designated as formulation #1. The second of these differed by the incorporation of 0.5 volume percent Multifilm-L, a surface-active adjuvant which is a proprietary mixture of petroleum oil, alkyl aryl sulfonates and free and combined fatty acids, described in U.S. Re. 22,340.

These materials were applied to young living cotton plants at the 3–4 leaf stage and observations made for wilting, defoliation, desiccation and regrowth. Table I presents the observations made, and gives the rate of application in lbs. of active ingredient per acre—the designated quantity being contained in 20 gallons of spray.

A similar test was made using cotton plants about two feet tall, each containing 4–5 open bolls on old growth. The young top growth possessed some flowers and very young bolls. Results are presented in Table II.

TABLE I

| Formulation | Rate (lbs./acre) | Percent Wilt 24 hr. | Percent Wilt 48 hr. | Defoliation 5 days | Defoliation 13 days | Desiccation (13 days) | Regrowth (13 days) |
|---|---|---|---|---|---|---|---|
| No. 1 | 2 | 30 | 30 | 5 | 5 | 2 | 100 |
| No. 1 | 4 | 80 | 90 | 95 | 95 | 0 | 50 |
| No. 2 | 2 | 20 | 30 | 5 | 5 | 5 | 100 |
| No. 2 | 4 | 80 | 85 | 95 | 95 | 2 | 30 |

TABLE II

| Formulation | Rate (lbs./acre) | Percent wilt (24 hrs.) | No. of original leaves | 2 day observation Leaves present | 2 day observation Percent def. | 5 day observation Leaves present | 5 day observation Percent def. |
|---|---|---|---|---|---|---|---|
| No. 2 | 3 | 30 | 155 | 159 | 0 | 147 | 5.2 |
| No. 2 | 6 | 70 | 147 | 123 | 16.3 | 109 | 25.9 |
| No. 1 | 3 | 25 | 138 | 135 | 2.2 | 117 | 15.9 |
| Control | | 0 | 177 | 176 | <1 | 176 | <1 |

Additional tests were made on cotton plants to demonstrate the activity of compounds coming within the scope of the instant invention. In addition to testing of the salts, the free acid of Example 1 was tested. Tests were performed with the same types of formulations as in the previous experiments (i.e. Formulation No. 1—aqueous solution; Formulation No. 2—same plus 0.5 vol. percent Multifilm-L). Observations included percent wilt at 24 and 48 hours; percent defoliation at 5 days and 13 days; percent desiccation at 13 days and percent regrowth after 13 days. Application was always at a spray volume equivalent to 20 gallons per acre. Data are presented below in Table III.

TABLE III

| Active Ingredient | Rate, lbs./acre | Formulation No. | Percent Wilt 24 hr. | Percent Wilt 48 hr. | Defoliation 5 days | Defoliation 13 days | Desiccation (13 days) | Regrowth (13 days) |
|---|---|---|---|---|---|---|---|---|
| Free acid | 2 | 1 | 30 | 30 | 10 | 10 | 20 | 100 |
| Do | 4 | 1 | 70 | 85 | 85 | 85 | 2 | 50 |
| Do | 2 | 2 | 50 | 50 | 30 | 30 | 5 | 100 |
| Do | 4 | 2 | 80 | 80 | 50 | 50 | 10 | 60 |
| Ammonium salt | 2 | 1 | 30 | 30 | 5 | 5 | 2 | 100 |
| Do | 4 | 1 | 80 | 90 | 95 | 95 | 0 | 50 |
| Do | 2 | 2 | 20 | 30 | 5 | 5 | 5 | 100 |
| Do | 4 | 2 | 80 | 85 | 95 | 95 | 2 | 30 |
| Monomethylamine salt | 2 | 1 | 10 | 10 | 5 | 5 | 0 | 100 |
| Do | 4 | 1 | 40 | 40 | 25 | 35 | 2 | 50 |
| Do | 2 | 2 | 40 | 50 | 10 | 10 | 2 | 100 |
| Do | 4 | 2 | 40 | 50 | 10 | 10 | 5 | 100 |
| Monoethylamine salt | 2 | 1 | 30 | 30 | 5 | 5 | 0 | 100 |
| Do | 4 | 1 | 40 | 40 | 30 | 30 | 10 | 80 |
| Do | 2 | 2 | 40 | 40 | 10 | 10 | 2 | 100 |
| Do | 4 | 2 | 50 | 55 | 30 | 30 | 2 | 100 |
| Monoisopropylamine salt | 2 | 1 | 10 | 10 | 5 | 5 | 0 | 100 |
| Do | 4 | 1 | 30 | 30 | 30 | 30 | 0 | 80 |
| Do | 2 | 2 | 40 | 40 | 5 | 5 | 5 | 100 |
| Do | 4 | 2 | 55 | 70 | 20 | 20 | 2 | 100 |
| Methylamine salt | 2 | 1 | 10 | 10 | 5 | 5 | 0 | 100 |
| Do | 4 | 1 | 20 | 20 | 5 | 5 | 5 | 90 |
| Do | 2 | 2 | 30 | 30 | 5 | 5 | 0 | 100 |
| Do | 4 | 2 | 40 | 50 | 5 | 5 | 0 | 100 |
| Monoethanolamine salt | 2 | 1 | 10 | 10 | 0 | 0 | 0 | 100 |
| Do | 4 | 1 | 20 | 20 | 5 | 5 | 2 | 100 |
| Do | 2 | 2 | 10 | 20 | 0 | 0 | 0 | 100 |
| Do | 4 | 2 | 40 | 40 | 25 | 25 | 0 | 60 |
| Triethanolamine salt | 2 | 1 | 0 | 0 | 0 | 0 | 0 | 100 |
| Do | 4 | 1 | 0 | 0 | 2 | 0 | 0 | 100 |
| Do | 2 | 2 | 10 | 10 | 0 | 0 | 0 | 100 |
| Do | 4 | 2 | 20 | 20 | 2 | 2 | 2 | 100 |

It will be noted from Table III that the free acid has definite agricultural activity in the applications under consideration. Surprisingly, the particular salts of the invention have an activity which often compares favorably to that of the free acid. Further, they have other characteristics which make them suitable for practical and safe use where the free acid is unsuitable. Consider, for example, two such areas namely dermatitis and corrosivity:

Tests were performed with two solutions to give indications of the relative dermatological effects.

Solution #1: Parts by weight
  Product of Example 1 _____ 71.5
  Ethylene glycol _____ 17.0
  Surfactant _____ 11.5
Solution #2:
  Ammonium salt of free acid _____ 90.0
  Ethylene glycol _____ 8.0
  Surfactant _____ 2.0

Filter paper strips were impregnated with the above solutions and were applied to the freshly shaven skin of guinea pigs. The papers were kept in contact with the skin for 24 hours. Solution #1 caused a brown discoloration and necrosis developed within a few days which gradually healed with the formation of scar tissue. Solution #2 caused a buff color to develop but no necrosis developed thereafter.

The same preparations were applied to the skin of the animals, using sterile cotton swabs, for a period of three hours and then removed using a sodium bicarbonate wash solution. Solution #1 caused a dark brown color, raised blebs which oozed, and caused development of moderate necrosis which gradually healed after one week by the formation of scar tissue and scabs. Solution #2 caused only a slight discoloration which disappeared within 3 days.

Acute dermal toxicity was determined on rabbits using conventional testing techniques. The $LD_{50}$ for the free acid was 178 mg./kg. of body weight—below the level set by U.S.D.A. for a toxic substance highly toxic to man. The $LD_{50}$ for the ammonium salt was 3,160 mg./kg. of body weight. Other salts are similarly favorable when compared to the free acid.

Corrosivity was tested by using coupons of materials commonly used in agricultural spraying equipment. For example, immersion tests were made with ½″ x ½″ coupons of 16 gage carbon steel of a type used for spray tanks. The coupons were immersed for a predetermined time in a quantity of test fluid which provided 55 cc. of solution per square inch of coupon surface. The free acid of Example 1 was tested as a solution comprising xylene and ethylene glycol. The salt of Example 2 was tested as an aqueous solution containing 0.5 weight percent Multifilm-L. The concentration of active ingredient (i.e. the corrosive acid and salt respectively) was adjusted to give the values indicated under the heading "Concentration" in Table IV which follows. Corrosion was measured after 48, 96 and 264 hours. It is seen that the salt is far less corrosive to carbon steel than the free acid.

In Table V additional data are presented based on 48 hour observations of the effect of the same types of solutions on the indicated materials. The nylon type materials tested are commonly used in spraying nozzles.

TABLE IV

| Test material | Concentration, lbs./gal. | 48 hr. corrosion rate, mils/yr. | 96 hr. corrosion rate, mils/yr. | 264 hrs corrosion rate, mils/yr. |
| --- | --- | --- | --- | --- |
| Acid of Example 1 | 0.2 | 148.2 | 129.8 | 98.2 |
|  | 0.4 | 166.6 | 137.3 | 109.6 |
|  | 0.8 | 165.1 | 134.3 | 99.3 |
| Salt of Example 2 | 0.18 | 58.2 | 54.3 | 40.6 |
|  | 0.35 | 64.2 | 62.7 | 68.8 |
|  | 0.83 | 57.4 | 57.5 | 65.3 |

TABLE V

|  | Free acid, 0.36 lbs./gal. | Salt of Ex. 1, 0.35 lbs./gal. |
| --- | --- | --- |
| Steel, mils/yr | 166.6 | 64.2 |
| 304 Stainless Steel, mils/yr | 1.0 | <0.1 |
| Brass, mils/yr | 10.7 | 12.2 |
| Nylon 610—A nylon obtained by the condensation of hexamethylene-diamine with sebacic acid. | Unsatisfactory[1] | Satisfactory |
| Nylon 66—A nylon obtained by the condensation of hexamethylene-diamine with adipic acid. | ___do[1] | Do. |

[1] Became soft and tacky.

Field tests were made using various salts of the invention applied as sprays containing various surfactants. It was found that use of from 3 to 6 pounds of active ingredient per acre causes significant boll opening within 7 to 16 days under conditions where the bolls would otherwise be closed. The activity is enhanced by the use of surfactants which aid penetration of the waxy layer on the plant and in uniform distribution of active ingredient. It was also determined that for wilting a noticeable effect will be obtained with as little as 1#/acre and up to 6#/acre can be used. Rates of about 4#/acre are generally preferred when wilt harvesting is to be used. These quantities of harvest aid cause wilting to occur within about 4 to 24 hours and defoliation to occur thereafter, generally within 6 to 14 days after application. If desired, cotton may be harvested after wilting takes place and again after defoliation. Alternatively, all the cotton may be harvested after defoliation. Where the material is used solely as a desiccant, rates of application of above about 6–10#/acre prove most effective for a wide variety of growth and climatic conditions.

Some of these effects are evidenced by the data in Tables VI, VII and VIII where the active ingredient was, in each instance, the salt of Example 2.

Table VI shows the effectiveness of the active material in wilting and boll opening. Solutions were applied at a rate equivalent to 20 gallons per acre. At time of treatment the plants were from 1 to 1½ feet tall and were slightly chlorotic due to maturity and water stress. The formulations used in this test, and in the tests subsequently described, were as follows:

Formulation #1—Aqueous solution of active ingredient;
Formulation #2—Aqueous solution of active ingredient plus 8% by weight of ethylene glycol based on weight of spray solution;
Formulation #3—Aqueous solution of active ingredient plus 8% by weight of ethylene glycol plus 0.5% by volume of Multifilm-L;
Formulation #4—Aqueous solution of active ingredient plus 0.5% by volume, based on spray solution volume, of Multifilm-L.

Table VI indicate that the active ingredient is an effective wilting agent and that its effectiveness as a boll opener can be significantly enhanced by the use of ethylene glycol as an adjuvant either as the sole adjuvant or in combination with a surfactant.

The plants used for the tests reported in Table VII were from 3 to 3.5 feet high. Leaf and boll counts were made on each and the percentile observations were made on the basis of such counts. Note again how the use of adjuvants markedly changed the effectiveness of the material for desiccation and boll opening. The active ingredient in each instance was contained in 20 gallons of spray solution.

Table VIII gives data resulting from a series of tests on various groups of cotton plants. The older plants tested were taller than the younger plants and had more leaves. This test was to determine the effectiveness of the active ingredient as a wilting agent and a desiccant. The active ingredient was prepared in 20 gallons of solution (e.g. 3#/20 gallons and 6#/20 gallons) and sprayed to the run-off point.

While several embodiments of the invention have been described in detail, it is apparent that the formulations can be utilized in a variety of methods all adapted to increase the yield of cotton harvested and increase the profitability of cotton growing. Since many modifications and variations of the invention as hereinbefore set forth may be made without departing from the spirit and scope thereof, only such limitations should be imposed thereon as are indicated in the appended claims.

TABLE VI

| Rate (lbs./acre) | Formulation No. | Wilt (0-10 scale) 24 hrs. | Wilt (0-10 scale) 48 hrs. | Percent boll opening [1], 7 days |
|---|---|---|---|---|
| 3 | 2 | 8.5 | 8.5 | 36.4 |
| 3 | 1 | 8.5 | 8.5 | 18.2 |
| 3 | 3 | 8.5 | 8.5 | 46.2 |
| 3 | 3 | 8.0 | 8.0 | 50.0 |
| 3 | 4 | 5.0 | 5.0 | 12.5 |

[1] All bolls initially closed.

TABLE VII

| Formulation | Rate (lbs./a.) | Formulation No. | Initial No. leaves | Percent Abscission | Percent Desiccation | Percent boll opening [1] 7 days [2] | Percent boll opening [1] 16 days [3] |
|---|---|---|---|---|---|---|---|
| AP-20N | 3 | 4 | 159 | 26 | 10 | 15 | 36 |
| AP-20N | 6 | 4 | 120 | 50 | 28 | 55 | 44 |
| AP-20N | 3 | 1 | 122 | 39 | 1 | 0 | 0 |
| Check | | | 169 | 2 | 0 | 0 | 0 |

[1] All bolls initially closed.
[2] Total No. of bolls from 4 to 13.
[3] Total No. of bolls from 6 to 11.

TABLE VIII

| Formulation | Rate (lbs./acre) | Formulation | Average initial total leaves | 7 day observation Percent abscission | 7 day observation Percent desiccation | 7 day observation Percent green | 16 day observation [1] Percent abscission | 16 day observation [1] Percent desiccation | 16 day observation [1] Percent green | Regrowth factor Final total all leaves | Regrowth factor Initial total all leaves |
|---|---|---|---|---|---|---|---|---|---|---|---|
| Young plants | 3 | No. 4 | 28 | 21.4 | 57.3 | 21.4 | 15.0 | 22.5 | 62.5 | 40/28 | 1.4 |
| | 6 | No. 4 | 27 | 22.2 | 59.3 | 18.5 | 9.2 | 16.9 | 73.9 | 65/27 | 2.4 |
| | 3 | No. 1 | 29 | 31.0 | 20.7 | 48.3 | 15.5 | 6.9 | 77.6 | 58/29 | 2.0 |
| | | Control | 35 | 8.6 | 0.0 | 91.4 | 4.7 | 3.1 | 92.2 | 64/35 | 1.8 |
| Older plants | 3 | No. 4 | 41 | 39.0 | 31.8 | 29.2 | 34.0 | 25.5 | 40.5 | 47/41 | 1.1 |
| | 6 | No. 4 | 51 | 49.0 | 35.3 | 15.7 | 45.5 | 21.8 | 32.7 | 55/51 | 1.1 |
| | 3 | No. 1 | 55 | 20.0 | 14.5 | 65.5 | 31.4 | 5.7 | 62.9 | 35/55 | 0.6 |
| | | Control | 59 | 3.4 | 1.7 | 94.9 | 5.5 | 0.0 | 94.5 | 36/59 | 0.6 |

[1] Based on total of all leaves, including regrowth.

We claim:

1. A method of harvesting cotton comprising the steps of:
   (a) applying to mature cotton plants, in situ, a composition comprising a salt of 2,3,5,5,5-pentachloro-4-keto pentenoic acid in an amount effective to cause wilting to occur within 4 to 24 hours after spraying, and
   (b) picking cotton from the plants after wilting has occurred.

2. The method of claim 1 wherein said salt is the reaction product of ammonia and said acid.

3. The method of claim 1 wherein said salt is the reaction product of an organic amine and said acid.

4. In a method of harvesting cotton the improvement comprising the steps of:
   (a) applying to living cotton plants, a sufficient quantity of a salt of 2,3,5,5,5-pentachloro-4-keto pentenoic acid to cause defoliation and boll opening, and
   (b) picking cotton from said plants after defoliation and boll opening have occurred.

5. The method of claim 4 wherein said salt is the reaction product of ammonia and said acid.

6. The method of claim 4 wherein said salt is the reaction product of an organic amine and said acid.

7. In a method of harvesting cotton the improvement comprising the steps of:
   (a) applying to cotton plants, in situ, a sufficient quantity of a salt of 2,3,5,5,5-pentachloro-4-keto pentenoic acid to cause desiccation of the plants, and
   (b) strip picking the plants to recover cotton therefrom.

8. The method of claim 7 wherein said salt is the reaction product of ammonia and said acid.

9. The method of claim 7 wherein said salt is the reaction product of an organic amine and said acid.

References Cited

UNITED STATES PATENTS

| 3,238,667 | 3/1966 | Remmert | 47—1.7 |
| 3,238,668 | 3/1966 | Abbott et al. | 47—1.7 |
| 3,472,004 | 10/1969 | Erby et al. | 56—1 |

RUSSELL R. KINSEY, Primary Examiner

U.S. Cl. X.R.

47—1.7